United States Patent [19]

Stuart

[11] Patent Number: 5,613,110
[45] Date of Patent: Mar. 18, 1997

[54] INDEXING METHOD AND APPARATUS FACILITATING A BINARY SEARCH OF DIGITAL DATA

[75] Inventor: Anthony F. Stuart, Boulder, Colo.

[73] Assignee: International Business Machines Corporation, Armonk, N.Y.

[21] Appl. No.: 368,824

[22] Filed: Jan. 5, 1995

[51] Int. Cl.$^6$ ................................................ G06F 17/30
[52] U.S. Cl. .................... 395/601; 395/925; 395/934; 395/234; 395/229; 364/DIG. 1
[58] Field of Search ................................ 395/600, 925, 395/934; 364/401, 222.9, 406, 408, DIG. 1

[56] References Cited

U.S. PATENT DOCUMENTS

| | | | |
|---|---|---|---|
| 4,809,158 | 10/1985 | McCauley | 395/600 |
| 5,210,870 | 3/1990 | Baum et al. | 395/600 |
| 5,237,678 | 8/1993 | Kuechler et al. | 395/600 |
| 5,303,361 | 4/1994 | Colwell et al. | 395/600 |
| 5,319,778 | 6/1994 | Catino | 395/600 |
| 5,325,290 | 6/1994 | Cauffman | 364/401 |
| 5,440,734 | 8/1995 | Wagar | 395/600 |

FOREIGN PATENT DOCUMENTS 0583108  2/1994  European Pat. Off. .

*Primary Examiner*—Thomas C. Black
*Assistant Examiner*—Hosain T. Alam
*Attorney, Agent, or Firm*—Homer L. Kneal; Saul A. Seinberg

[57] ABSTRACT

An ordered index file is created for archived report data wherein each index file contains a series of 4-byte offsets into the report data. Each offset points to a field within a row of the report data from archival storage. Upon later retrieval from the report data, a binary search is performed for a key(s) that is contained in a search query, using the index field offsets to determine the order in which to retrieve the report data fields. The binary search resolves each key in the search query to a range of index offsets corresponding to report rows that match the query. The search technique optimize final filtering of matches by using the search query that matched the smallest range as the controlling field for resolving overlap of fields in the search query. Since all of the offsets refer to the same report file, this optimization operation compares the offsets of the fields, rather than comparing the field values themselves. A range check is performed before the binary search to determine whether the search key is outside the range of keys that are in the ordered index files, thereby preventing unnecessary searching of indexes that cannot contain the search key(s).

3 Claims, 13 Drawing Sheets

REPORT 540  XYZ BANK
LABOR COST CURRENT ANALYSIS
ACTUAL COMPARED TO LAST YEAR ACTUAL
MONTH - 07/31/90

| | ACTUAL | LAST YEAR ACTUAL | VARIANCE DOLLARS | PCT. |
|---|---|---|---|---|
| | | THE XYZ BANK | | |
| | 4,365,566 | 3,860,315 | 505,252 | 13.1 |
| | 89,005 | 79,868 | 9,137 | 11.4 |
| | 138,524 | 106,241 | 32,282 | 30.4 |
| | 133,030 | 77,688 | 55,342 | 71.2 |
| | 99,033 | 38,308 | 60,727 | 158.5 |
| | 667 | 1,133 | 467CR | 41.2- |
| | 51,123 | 51,356 | 233CR | 0.5- |
| | 101,158 | 20,775 | 80,383 | 386.9 |
| | 4,978,106 | 4,235,682 | 742,424 | 17.5 |

FIG. 4A

| FIG. 4A | FIG. 4B |
|---|---|

FIG. 4B

| | ACCOUNT TITLES | YEAR-TO-DATE LAST YEAR ACTUAL | ACTUAL | VARIANCE DOLLARS | PCT. |
|---|---|---|---|---|---|
| 701003 | REGULAR SALARIES | 29,906,680 | 26,723,014 | 3,183,666 | 11.9 |
| 702004 | SALARY EXPENSE | 608,986 | 601,361 | 7,625 | 1.3 |
| 703108 | PART TIME SALARIES | 1,053,898 | 801,605 | 252,293 | 31.5 |
| 703207 | TREFOIL TEMPS | 662,699 | 403,588 | 259,111 | 64.2 |
| 705004 | OVERTIME | 647,830 | 258,896 | 388,934 | 150.2 |
| 705007 | OVERTIME SALARIES | 9,026 | 8,958 | 68 | 0.8 |
| 707002 | SALARIES-FOREIGN OFFICE | 364,460 | 342,014 | 22,447 | 6.6 |
| 921007 | CONTRACT EMPLOYMENT | 283,050 | 132,783 | 150,267 | 113.2 |
| TOTAL | LABOR | 33,536,629 | 29,272,219 | 4,264,411 | 14.6 |

PRODUCED 08/14/90   PAGE 1

36 YEAR-TO-DATE   38

1599

REPORT 540

XYZ BANK
LABOR COST CURRENT ANALYSIS
ACTUAL COMPARED TO LAST YEAR ACTUAL

MONTH - 07/31/90

| | ACTUAL | LAST YEAR ACTUAL | VARIANCE DOLLARS | PCT. |
|---|---|---|---|---|
| 10000 | | EXECUTIVE MANAGEMENT DEPT | | |
| | 83,739 | 109,102 | 25,362CR | 13.1 |
| | 0 | 1,805 | 1,805CR | 100.0- |
| | 0 | 1,041 | 1,041CR | 100.0- |
| | 989 | 615 | 375 | 61.0 |
| | 84,729 | 112,562 | 27,834CR | 24.7- |

FIG. 5A

| FIG. 5A |
|---|
| FIG. 5B |

FIG. 5B

| | | PRODUCED 08/14/90 | | PAGE 2 | | |
|---|---|---|---|---|---|---|
| | | YEAR-TO-DATE | | LAST YEAR | VARIANCE | |
| | ACCOUNT TITLES | ACTUAL | ACTUAL | DOLLARS | | PCT. |
| 701003 | REGULAR SALARIES | 3,500,000 | 608,951 | 112,886 | | 18.5 |
| 703207 | TREFOIL TEMPS | 0 | 10,093 | 10,093CR | 100.0- |
| 705004 | OVERTIME | 303 | 8,882 | 8,579CR | 96.6- |
| 921007 | CONTRACT EMPLOYMENT | 6,967 | 3,037 | 3,930 | | 129.4 |
| TOTAL | LABOR | 729,106 | 630,962 | 98,145 | | 15.6 |

2799

1599

REPORT DEFINITIONS
29

| FIELD NAME | FIELD LENGTH | FIELD TYPE |
|---|---|---|
| 35 — TITLE | 30 BYTES | TEXT |
| 37 — ACTUAL | 10 BYTES | NUMERIC |

FIG. 9

"TITLE" INDEX

| 4-BYTE FIELD OFFSET | 4-BYTE PAGE OFFSET |
|---|---|
| 0170 | 0000 |
| 0250 | 0000 |
| 1170 | 1000 |
| 1250 | 1000 |
| 1330 | 1000 |
| ------ | ------ |
| 4XXX | 4000 |

↗ 40

↖ 44

"ACTUAL" INDEX

| 4-BYTE FIELD OFFSET | 4-BYTE PAGE OFFSET |
|---|---|
| 0200 | 0000 |
| 0280 | 0000 |
| 1200 | 1000 |
| 1280 | 1000 |
| 1360 | 1000 |

↗ 41

"ACTUAL" INDEX

| 4-BYTE FIELD OFFSET | | 4-BYTE PAGE OFFSET |
|---|---|---|
| 0 | 1280 | 1000 |
| 8 | 1360 | 1000 |
| 16 | 0280 | 0000 |
| 24 | 0200 | 0000 |
| 32 | 1200 | 1000 |

"TITLE" INDEX

| 4-BYTE FIELD OFFSET | | 4-BYTE PAGE OFFSET |
|---|---|---|
| 0 | 1330 | 1000 |
| 8 | 0250 | 0000 |
| 16 | 0170 | 0000 |
| 24 | 1170 | 1000 |
| 32 | 1250 | 1000 |

FIG. 12

```
ENTER SEARCH KEYS                    [ SEARCH ] — 53

┌─── 50
TITLE      │ REGULAR │
         51 ┌──────┐   ┌────────┐ — 52
ACTUAL    │1000000│   │40000000│
```

FIG. 13

```
ENTER SEARCH KEYS                    [ SEARCH ] — 53

┌─── 50
TITLE      │ REGULAR │
         51 ┌──────┐   ┌────────┐ — 52
ACTUAL    │1000000│   │40000000│

SELECTED ITEMS
                                      [ VIEW ]
     TITLE          ACTUAL
     REGULAR        29906680
     REGULAR        35000000
                                        — 55
```

INDEXING METHOD AND APPARATUS FACILITATING A BINARY SEARCH OF DIGITAL DATA

BACKGROUND OF THE INVENTION

1. Field of the Invention:

This invention relates to the field of indexing digital data prior to archival storage thereof, the indexing technique facilitating later retrieval of the data from archival storage by the use of a binary search. This invention has particular Utility in the storage and retrieval of static digital data; i.e., digital data that is not updated or changed after creation and archival storage thereof.

2. Description of the Related Art:

Archive and report distribution systems generally provide indexed access to both digitally stored statement data and digitally stored report data. Statement data is typically indexed on 1 to 5 fields that occur at the beginning of each statement page. Statement data is exemplified by bills and invoices. Statement index examples are name, account number, and date. Report data is typically indexed on 1 to 5 fields that occur on each row, line or record of each report. Report data is exemplified by freight bills, remittance data, and listings. Report index examples are check number, account number, and date. Depending upon the number of rows per report page, storage of report data and its index may consume 50 to 100 times more index storage overhead per page than does the storage of statement data and its index. Since a typical report may contain over 1,000,000 pages, the report index overhead cost can be significant.

Using conventional relational database techniques to digitally store report data and its index often requires more disk space for storing the index than is used for storing the report data itself. Since the general purpose of a statement/report archive system is to store large volumes of statement/report data on low cost optical disks, and to store the statement/report indexes on higher cost magnetic disks, the use of relational database techniques is not cost efficient. In addition, relational database techniques generally provide for the possibility of record insertion and deletion, and these insert/delete functions are not used relative to static statement and report data that does not change once the data is created.

A number of known solutions exist for this high storage overhead problem. One such solution is the IBM/R/DARS product wherein multiple versions of the report are stored, each version being sorted by a field of the report that can be later used for data retrieval. In this approach, a relational database is used to store an index of every 100 or so report pages. The retrieval system now uses a relational database search query that resolves a search key to a 100 page group, this being followed by a sequential search of the data within that 100 page group. While this approach is more efficient in terms of storage than is a fully relational database technique, this approach involves storing a complete copy of the report for each field that can be used for retrieval, this approach requires a significant amount of relatively slow searching techniques, this approach involves numerous CPU intensive search key comparisons, and this approach is not well suited to multiple key search quires, such as the search query, name=Smith, account number=123-456, and date=01/05/94.

U.S. Pat. No. 5,303,361 is of general interest in that it describes a digital search and retrieval system wherein an index file is created, this index file representing the approximate position and relative frequency of every word in every file on a given storage unit. Later, when searching for a word, search of the index ranks the files based upon the relative strength of match with the search request. This index comprises distinct word records that includes a unique digital representation for each word along with one or more file records that include a file code for each file, a density code indicating the relative frequency of occurrence of each word in a file, and a position code indicating the approximate location of the word within a file. When two or more words are included in a search request, the rating is based, in part, upon a combination of the words' density fields, and on whether the multiple words appear in approximately the same location in the file based upon the position fields of the words. The index file of patents utilizes a random 4-byte hashing code for each data file word, and does not teach use of a binary search technique, as in the present invention. In addition, search of the index file of this patent is a hash table sequential search, and this patent does not teach a binary search with optimized resolution of multiple search keys.

U.S. Pat. No. 5,237,678 describes a system for storing and manipulating information in an information base wherein records in an information base comprise one or more fields that have an orderable value, meaning that the fields have a value that is capable of being evaluated and being placed in some order in relation to the value of the field for other records in the information base. This may include numbers, characters of the alphabet, symbols, codes, etc. Topographic maps of these fields of information are stored for use by an output subsystem query, this query being a reference to the information on the basis of a specification of the values of one or more fields. The topographic maps of the fields referenced in the specification are then retrieved and manipulated in accordance with the query, the end result being one or more output maps indicating information base records which do meet the specifications, may meet the specifications, and do not meet the specifications. This patent teaches sequential search of data once range inclusion is determined, rather than the use of binary search techniques as in the present invention.

Published European Patent Application 0 583 108 A2 describes an entity-relation database wherein a plurality of entity or data-receiving fields contain arrays of data elements, the data elements being related to each other in predefined sets, each predefined set including data elements in two data-receiving fields that are called key fields and item fields. Key fields contain an array of data entries each of which is unique; for example, a list of the serial numbers assigned to articles. Key fields are sorted or indexed as entries are made into the field. Thus, the entries of a key field form an ordered array similar to a flat file that can be searched using a binary search process to locate the desired entry.

While prior devices as exemplified above have been generally useful for their limited intended purposes, the need remains for a method and apparatus for storing and retrieving digital data wherein an ordered index file is created for the data, each index file containing a series of multi-byte offsets into the data (described herein are 4-byte offsets that are capable of storing up to 4 billion characters, but the spirit and scope of the invention is not to be limited thereto since 2-byte, 4-byte and 8-byte offsets are all of similar utility), each offset pointing to a field within a row of the data, wherein the total index overhead is minimized by storing only the data offsets and using the data from the statement or report for comparison, wherein upon retrieval a binary search is performed for a key that is contained in a search query, using the index field offsets to determine the order in which to compare fields in the report data, the binary search resolving each field in the search query to a range of rows that match the query, the search technique optimizing the final filtering of matches by using the search query that matched the smallest range as the controlling field for resolving overlap of fields in the search query, and wherein a range check is performed before the binary search to determine whether the search key is outside the range of keys that are in the index.

SUMMARY OF THE INVENTION

This invention utilizes a high performance indexing method to provide an ordered index file for each data field that can be used to retrieve data from a stored data file. While the invention will be described relative to a generic data file that is called a report file herein, the spirit and scope of the invention is not to be limited to this particular type of alphanumeric data file.

Each ordered index file in accordance with the invention contains a series of 4-byte offsets into the report data file. Each such offset points to a data field within a row of the archived report file.

A later retrieval search of the report file uses well-known binary search techniques; i.e., a dichotomizing search in which at each step of the search the set of data elements being searched is divided by two.

Upon a request to retrieve a data field from the report file, a binary search is performed for each key that is contained within a search query. This binary search uses the index file offsets to determine the order in which to compare data fields that are contained in the report file. This binary search resolves each key field in the search query to a range of report rows that match the query; for example, a wildcard search query of 123* matches the range of report rows 123000 through 123999.

The search is optimized by a filtering step that operates to use the search query that matched the smallest range of rows in the report as a controlling field, this controlling field being used to resolve overlap of search fields in the search query. Since all of the offsets refer to a common report file, this filtering step operates to compare the field offsets themselves, and does not require CPU intensive search key comparisons.

As a feature of the invention, a range check is performed prior to, or as part of, the above described binary search. This range check operates to determine whether the search key(s) is outside the range of the keys that are in the ordered index. In this way, needless searching of indexes that do not contain the search key(s) is avoided.

As a feature of the invention, indexing and retrieval processes in accordance therewith make use of a report definition that contains report parameters, such as the record length, the offset of each data field from the beginning of the record, the data field length, and the data field type.

While a preferred embodiment of the invention was implemented on an AIX (IBM version of UNIX) operating system, the invention is not to be limited to this computing embodiment, since the spirit and scope of the invention provides for implementation on virtually any computing system.

An object of the invention is to utilize the index output of a known archival system to produce and archive store a unique ordered index of each searchable item that is contained in a data record, wherein the 4-byte offset of each unique class of searchable items (for example, a text class and a numeric class) that is contained in the data file is ordered in the index as a serial sequence (for example, in an ascending order) in accordance with the actual data content of the class of searchable items, and wherein there is a one-to-one correspondence between the index fields, and the data fields that are indexed for search key retrieval.

An object of the present invention is to provide for retrieval of such indexed archival data using a binary search that is conducted for each search key in a search query, using memory mapped files to access the index file as an array in memory and using the report file as a buffer. Using the index offsets into the report file buffer, the query key(s) is compared against the index key for the first and last entries in the index to make sure that the query key is within the range of keys for the index. A binary search is then performed using the query keys and the index offsets into the report file. The number of matches is saved, as well as the offset of the first and last matches. The retrieval method of the invention filters the matches so as to resolve multiple keys to records that satisfy all of the search keys, thereby determining the set of report rows that match all of the specified keys.

These and other objects, advantages and features of the invention will be apparent to those of skill in the art upon reference to the following detailed description of the invention, which description makes reference to the drawing.

BRIEF DESCRIPTION OF THE DRAWING

FIGS. 4 and 5 provide a nonlimiting example of a 2-page report that will be indexed, archival stored, and searched in accordance with the present invention.

FIG. 9 shows a report index of FIG. 1 that is prepared by the server of FIG. 1A in accordance with the report definitions shown in FIG. 8.

FIG. 12 shows a nonlimiting example display screen that is presented to a user to allow the user to specify one or both of a "title" and an "actual" term, or an "actual" term range, to be used as a search key(s) for FIG. 1A's archive storage, wherein the user has specified the text "title" search key "regular", and has specified the numeric search range "10000000-to-40000000" for "actual".

FIG. 13 shows a screen display whereby the results of the binary search as presented to the user as a result of the search request shown in FIG. 12.

DETAILED DESCRIPTION OF THE INVENTION

Description of the Preferred Embodiments

Figure 1:
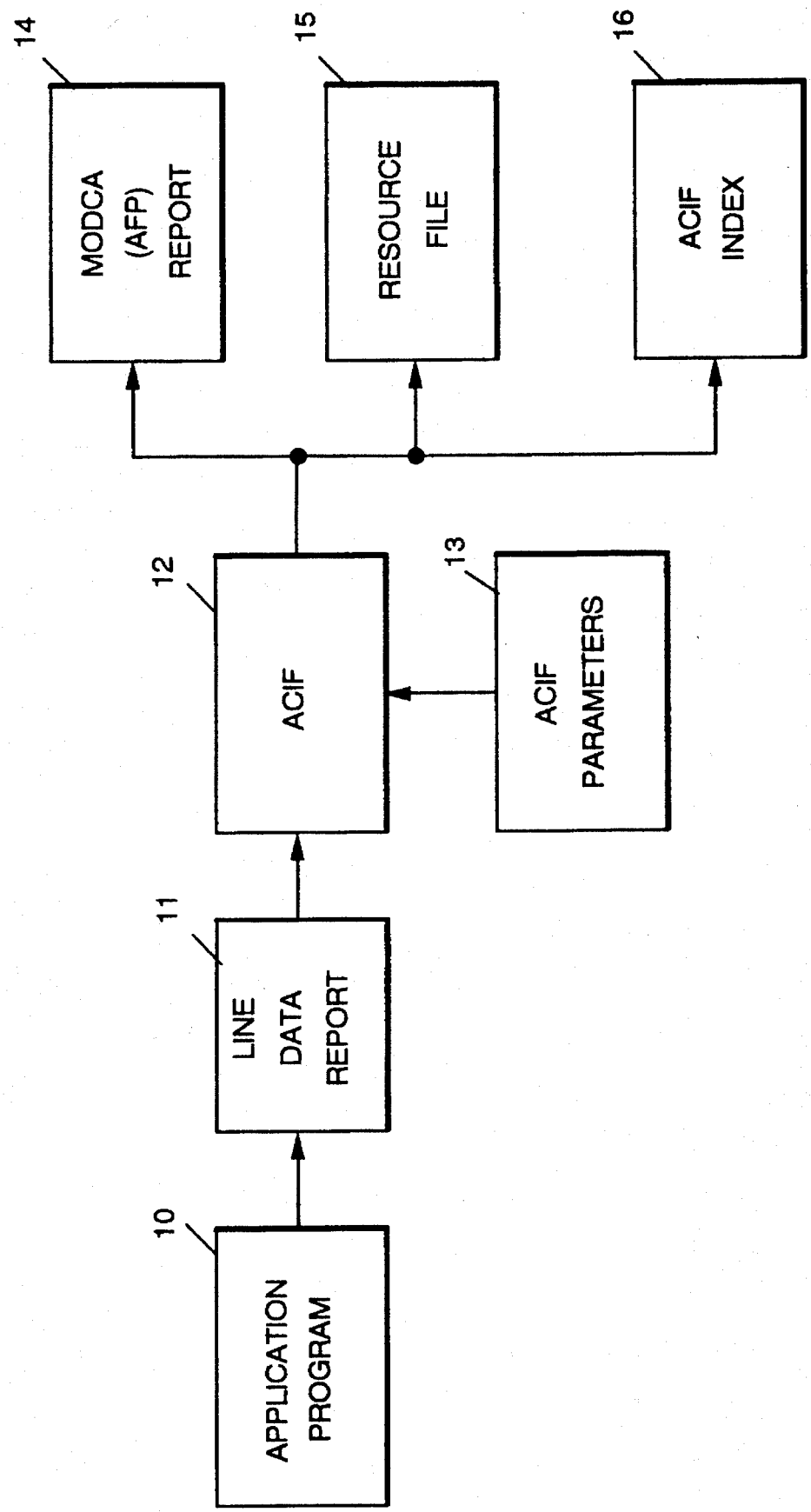
FIG. 1 shows a prior AFP Conversion and Indexing Facility (ACIF) data archival system with which the apparatus and method of the present invention finds utility.

FIG. 1 shows a prior data archival system with which the apparatus and method of the present invention finds utility. In the structure of this FIG. 1 system, a user application program 10 provides a line data report 11 that functions as input to the well known ACIF facility 12. ACIF facility 12 is provided with ACIF parameter input 13 whereby ACIF facility 12 operates upon line data report 11 to originate (1) MODCA or line data (AFP) report 14, (2) resource file 15 that contains items, such as report fonts and logos, and (3) ACIF index file 16. Index file 16 is generally in the MODCA format and contains "field name" and "value" page offset and field offset.

Figure 1A:
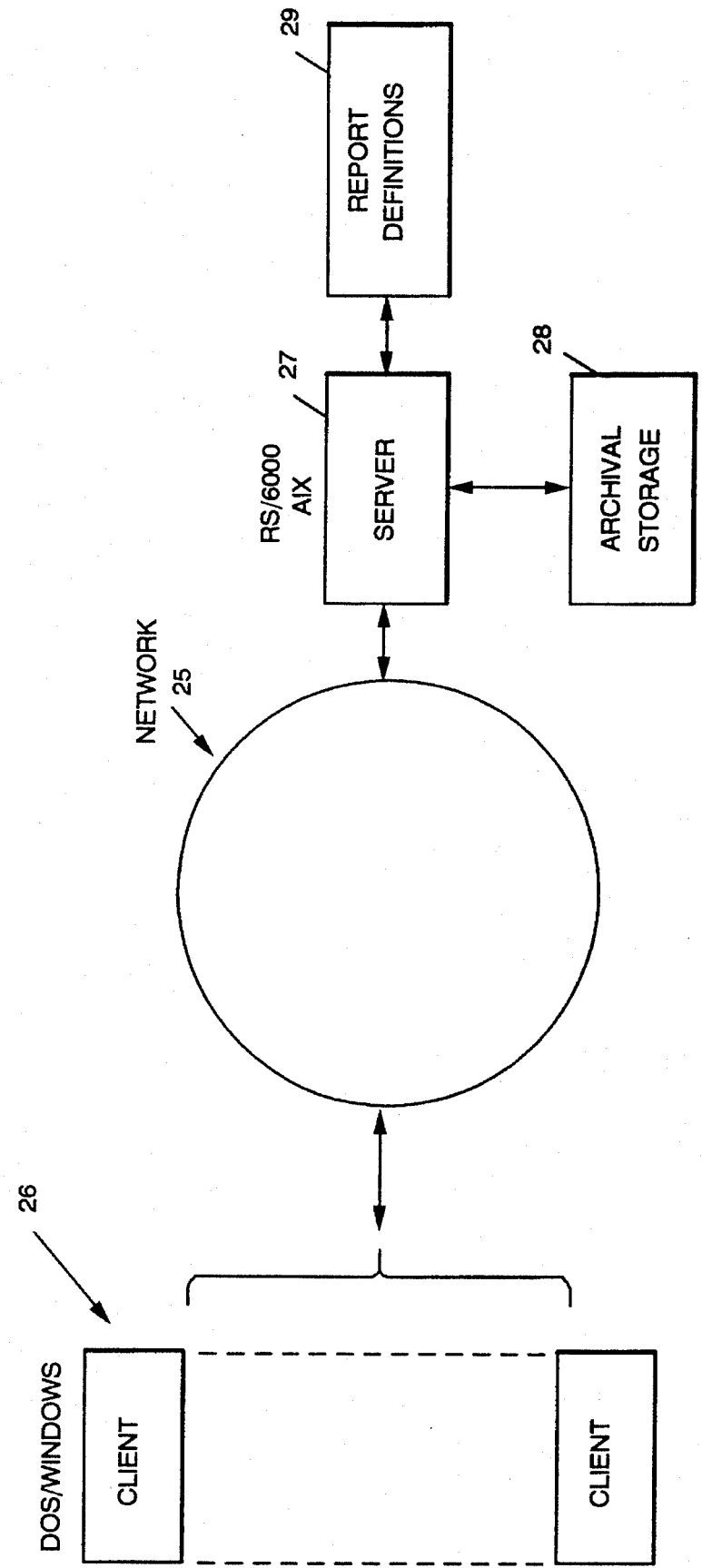
FIG. 1A shows a computer network that interconnects a plurality of clients to a server search engine in order to enable the clients to access archival storage, the server receiving as input a report definitions file in accordance with this invention.

The system of FIG. 1 operates to archive store report 14 and file 15 in a manner well known to those of skill in the art, and as generally shown at 28 in FIG. 1A.

The present invention utilizes index file 16, as will be described, to create an ordered index file for each field of report 14 that can be searched when later retrieving data from the archived report file.

For example, the arrangement of FIG. 1 may be implemented, as shown in FIG. 1A, wherein a well-known computer network 25 interconnects a plurality of DOS/WINDOWS clients 26 to an RS/6000 server search engine 27, in order to enable clients 26 to access archival storage 28, server 27 receiving as an input report definitions 29 in accordance with this invention, as will be described.

Figure 2:
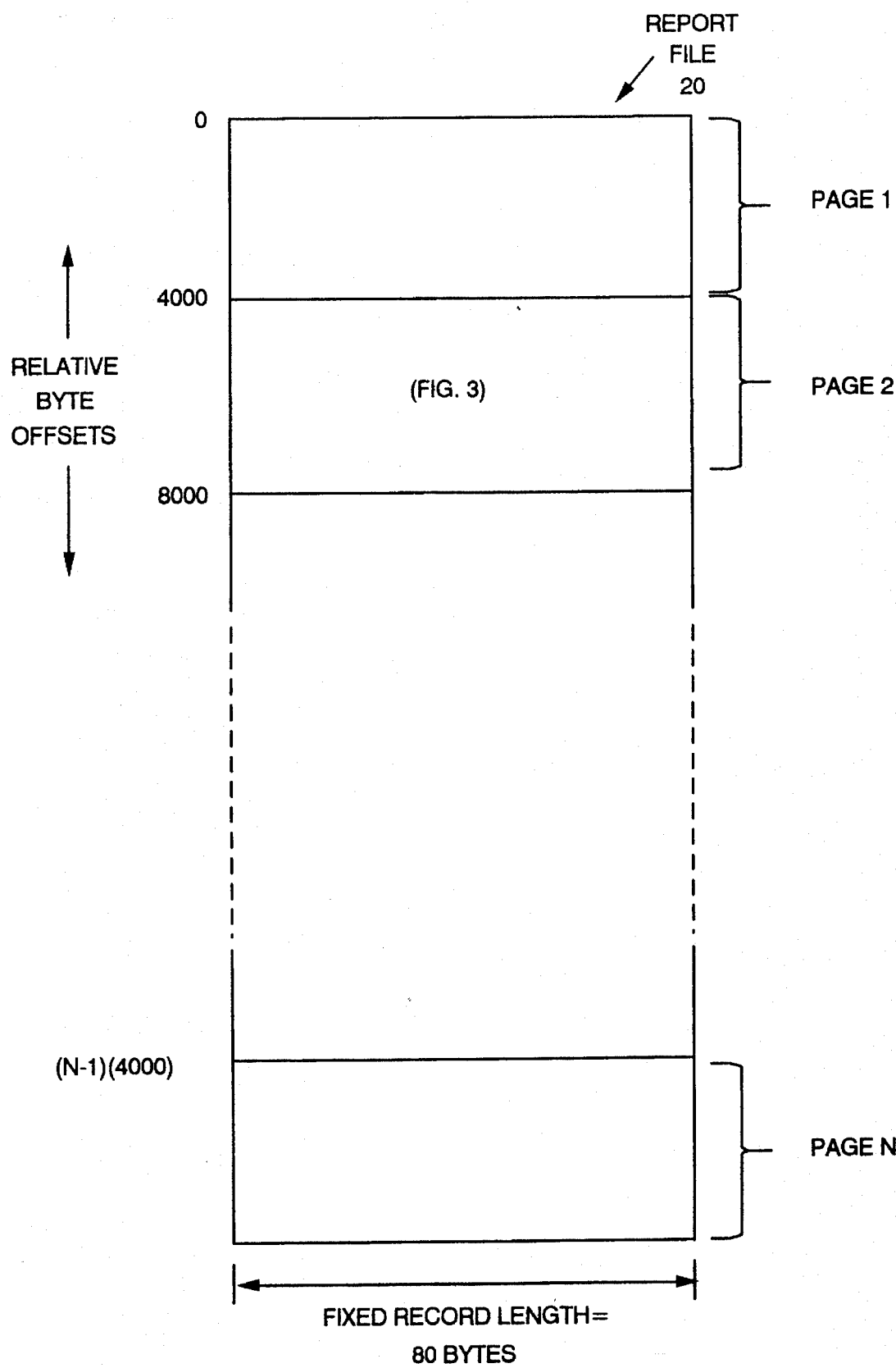
FIG. 2 is a pictorial representation of an archival stored report file in accordance with this invention.

FIG. 2 is a pictorial representation of an archive stored report file 20 in accordance with the present invention. As shown, report file 20 typically comprises a number N of individual pages of report data. In this nonlimiting example, each page comprises 4,000 bytes of data that is contained in 50 rows per page, each row having a fixed length equal to 80 bytes.

Figure 3:
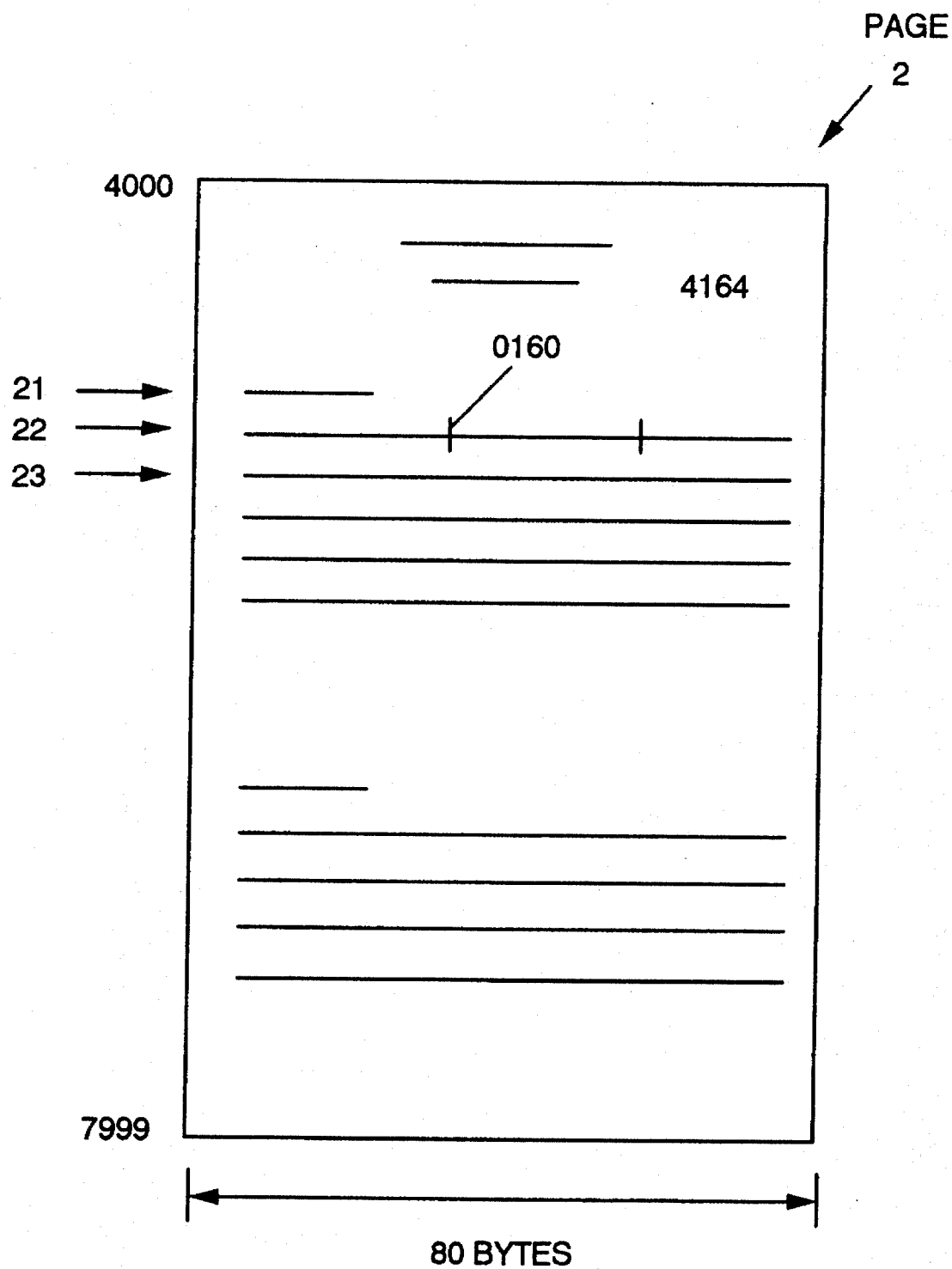
FIG. 3 is a pictorial representation of stored page 2 of the report file shown in FIG. 2.

FIG. 3 is a pictorial representation of stored "page 2" of report file 20 shown in FIG. 2. As shown in FIG. 3, page 2 begins at byte 4000 (decimal) and ends at byte 7999 (decimal). A number of rows 21,22,23, etc., are shown for page 2, and row 22 is shown as containing data byte offset 0160 (decimal). Since page 2 begins with byte 4000 (decimal), the index designation of offset 0160 in accordance with this invention is 4160 (decimal), i.e. page offset 4000 added to data byte offset 0160.

FIGS. 4 and 5 provides a nonlimiting example of a 2-page report entitled "REPORT 540" that will be indexed, archival stored, and searched in accordance with the present invention. FIGS. 4 and 5 comprise report data, or more generically line data, having a fixed record length of 100 bytes, thus illustrating that the fixed record length of such line data is not to be taken as a limitation on the present invention.

In this example, each page of "REPORT 540" may contain up to 80 records or rows, each row containing both text and numeric data fields. FIG. 4 represents page 1 of the report that utilizes only 16 of the 80 page rows, and FIG. 5 represents page 2 of the report that utilizes only 12 rows of that page. In the example of FIGS. 4 and 5, each row of each page comprises a fixed length of 100 bytes (rather than the 80 byte fixed record length suggested in FIGS. 2 and 3).

Thus, as is indicated in FIG. 4, the first byte of page 1 is designated byte 0000, and the last byte of page 1's line 16 is designated byte 1599. Likewise, the first byte of FIG. 4's first line is designated byte 1600, and the last byte of line 12 of FIG. 5 is designated byte 2799. In a like manner, page 3 of REPORT 540 will begin with byte 1800 as the first byte of line 1 thereof.

In accordance with the invention, two different types of offsets are present in FIG. 4,5 report pages 1 and 2; i.e., (1) the offset of the beginning of a page, and (2) the offset of the beginning of each data field within a page. The page offset of FIG. 4's report page 1 is "0000" (decimal), whereas the page offset of FIG. 5's report page 2 is "1600" (decimal) and, in a like manner, the page offset of report page 3 will be "3200" (decimal).

Figure 7:
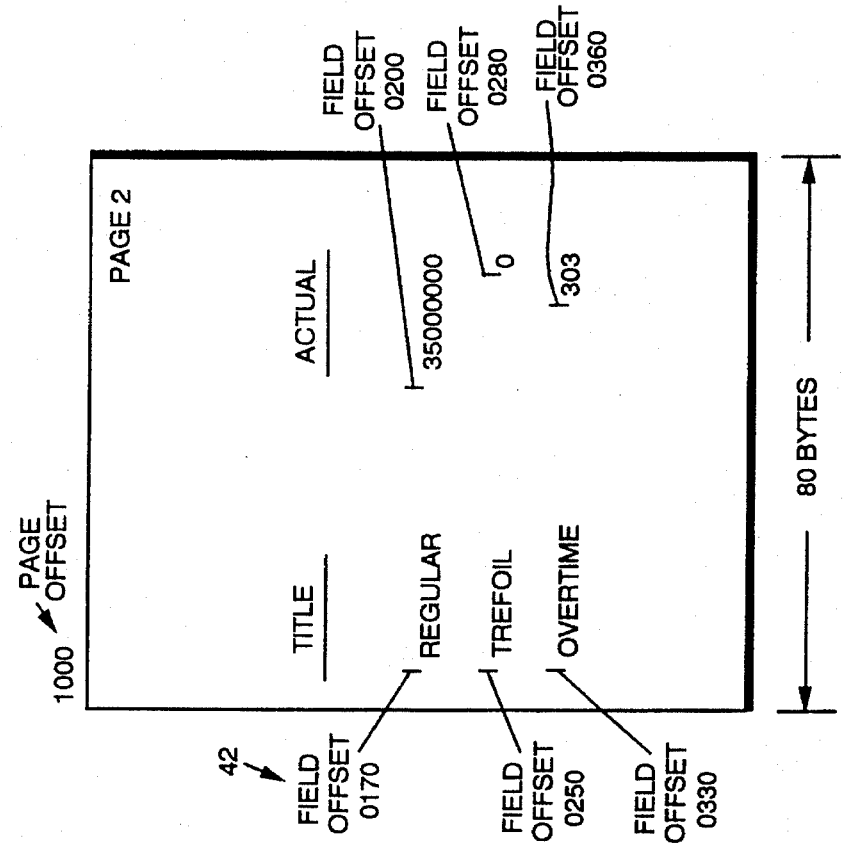
FIGS. 6 and 7 show another form of the FIG. 4 and 5 2-page report having offsets that are determined by the ACIF of FIG. 1.
Figure 6:
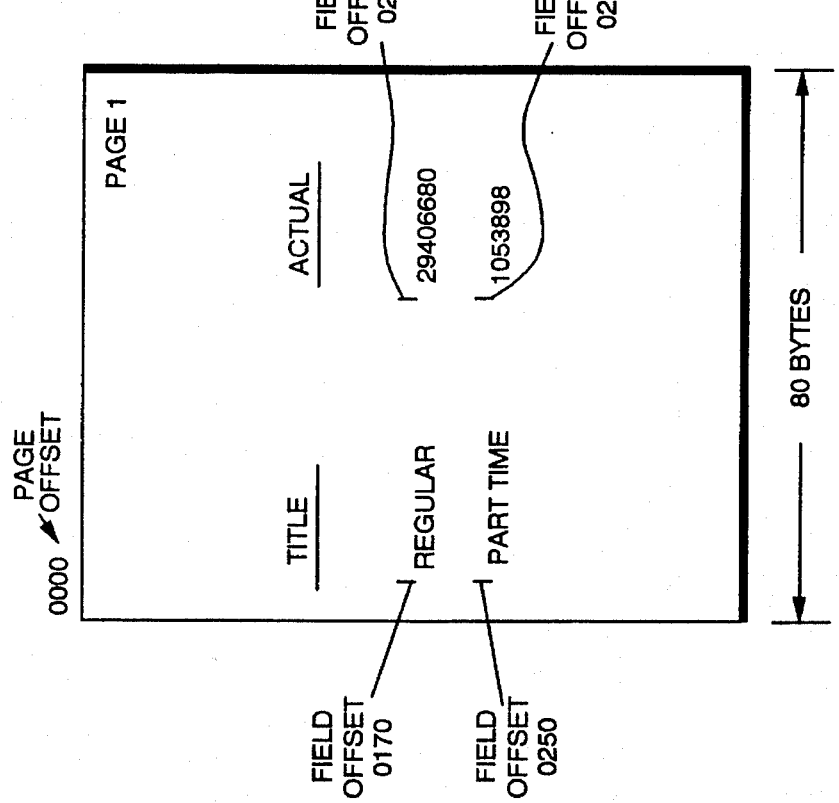

FIGS. 6 and 7 show a portion of ACIF index 16 of FIG. 1 that is provided for report pages 1 and 2 that are shown in FIGS. 4 and 5. FIGS. 6 and 7 are another representation of report pages 1 and 2 that contain details from report pages 1 and 2 plus offsets as are determined by ACIF 12 of FIG. 1.

In this example, the 4-byte page offset of report page 1 is "0000" (decimal), and the 4-byte page offset of report page 2 is 1000 (decimal).

Figures 8, 10:
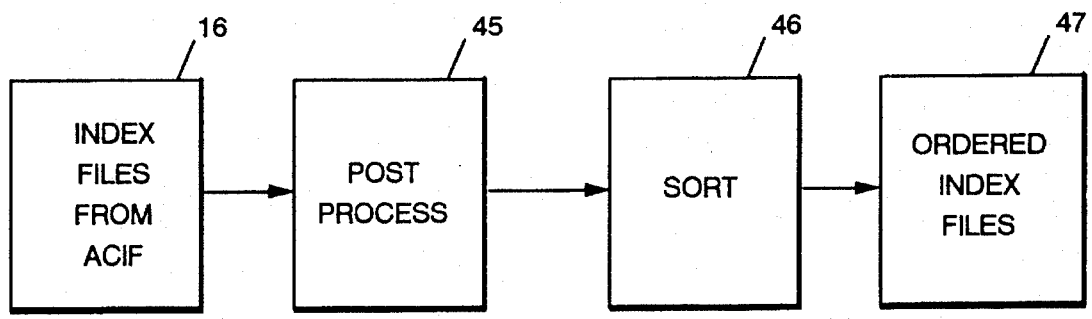
FIG. 8 shows an exemplary report definitions file of FIG. 1 that defines two types of search fields, i.e. text-type search field "title" and numeric-type search field "actual".
FIG. 10 shows the computing structure that operates to produce two ordered index files from the two index files of FIG. 9; i.e., the indexes that are provided by ACIF index of FIG. 1.

FIG. 8 shows an exemplary report definitions file 29 (see FIG. 1A) that defines two report data fields; i.e., data field "title" and data field "actual". Each "title" field is defined as being 30 bytes long, and is a text field. Each "actual" field is defined as being 10 bytes long and is a numeric field. Title field name 35, shown in FIG. 8, corresponds to "ACCOUNT TITLES" column 36 of FIGS. 4 and 5, whereas the actual field name 37 of FIG. 8 corresponds to "ACTUAL" column 37 of FIGS. 4 and 5. In addition, report definitions file 29 contains a record length field, and a field that defines the offset of each field from the beginning of the record. These two later fields are used during the filtering of overlapping keys (to be described) to determine whether matches are on the same row. The field type may optionally contain a flag that controls whether a match of an overlapping key must occur on the same page or on the same row.

Using report definitions 29 of FIG. 8, FIG. 6 shows that page 1 of "REPORT 540" contains two "title" entries and two "actual" entries, whereas page 2 contains three "title" entries and three "actual" entries. Note that for purposes of simplicity, only selected entries of these report pages and columns are shown.

Associated with each of the FIG. 6,7 "title" and "actual" entries is the 4-byte field offset value for the particular entry; thus, for example, the entry "29906680" under the "actual" field name has a 4-byte field offset value of "0200" (decimal).

FIG. 9 shows the report index 16 of FIG. 1 that is produced by server 27 of FIG. 1A in accordance with the present invention's report definitions 29 shown in FIG. 8.

That is, in accordance with report definitions 29 of FIG. 8, two indexes are provided by ACIF index 16 of FIG. 1; namely, a "title" index 40 and an "actual" index 41. Title index 40 provides the 4-byte field offset and a corresponding 4-byte page offset for each item within columns 36 of FIGS. 4 and 5, whereas actual index 41 provides the 4-byte field offset and a corresponding 4-byte page offset for each item within columns 38 of FIGS. 4 and 5.

All report page 1 items are assigned the 4-byte page offset "0000", and all report page 2 items are assigned the 4-byte page offset "1000". In this manner, all report pages are assigned a 4-byte offset value that is a function of a quantity that is equal to one minus the page number; i.e., all column 36,38 items of an assumed page 5 of "REPORT 540" would be assigned the 4-byte page offset "4000".

All 4-byte field offsets of report page 1 are assigned their original FIG. 6 field offsets. However, the 4-byte field offsets of all report page 2 items are assigned a field offset value that is equal to the sum of their original FIG. 7 field offsets and the page 2 page offset value of "1000". Thus, for example, the FIG. 7 4-byte field offset value of "0170", identified by reference numeral 42 in FIG. 7, becomes "1170" as identified by reference numeral 43 in FIG. 9. In this manner, all 4-byte field offsets for the above assumed report page 5 would become "4xxx", as is shown by the FIG. 9 entry that is identified by reference numeral 44.

As can be seen from FIG. 9, both "title" index 40 and "actual" index 41 are constructed by the structure of FIGS. 1 and 1A by sequentially considering the entries of the sequential report pages shown in FIGS. 4 and 5 for report "REPORT 540". That is, the index items of FIG. 9 are entered in the sequential order page 1 items, page 2 items, etc.

In accordance with the present invention, the two exemplary index files of FIG. 9 that are provided by ACIF index 16 of FIG. 1 are sorted to produce two ordered index files that correspond thereto. In this manner, an ordered index file is provided for each field that can later be used for data search and retrieval. In this exemplary case, the two report search fields are "title" and "actual".

Index files 40,41 are accessed as memory mapped files so as to facilitate access to index files 40,41 as an array in memory. The FIG. 4,5 archive of "REPORT 540" is accessed as a memory mapped file to facilitate access as a buffer, this being a well known data processing technique.

While the specific sorting computer program to be used is not critical to the invention, an embodiment of the invention used a modified Quick Sort function as is commercially supplied in Berkley UNIX 4.3.

This procedure is represented in FIG. 10 wherein index files 16 of FIG. 1; i.e., 40,41 of FIG. 9 are first post processed at 45 to reduce the data content thereof. More specifically, and as is well known by those of skill in the art, each search item of ACIF index file 16 comprises 4 data fields of variable length; for example, (1) a 32-byte field name, (2) a 32-byte field value, (3) a 10-byte page offset, and a (4) 10-byte field offset, i.e a total data content of 84-bytes per search item. Post processing function 45 operates to eliminate all field name and field value data fields, and additionally operates to compress each of the page offset and field offset data fields from 10-bytes each to the 4-bytes data fields that are described herein. Thus, an exemplary compression from 84-bytes to 8-bytes is achieved by function 45 of FIG. 10.

The post processed ACIF index files from function 45 are now sorted at function 46 in accordance with the invention, and as will be described, to thereby produce ordered index files 47. The original report data of FIGS. 4 and 5, and the ordered index files 47 of the invention that correspond thereto, are then archival stored as shown at 28 in FIG. 1A.

In general terms, sort function 46 operates to use the 4-byte page offsets of each of the FIG. 9 indexes 40,41 to locate the corresponding 4-byte field offset data fields in each row of the corresponding report page. Sort function 46 then compares the value of each data field that is identified by the field offsets, and rearranges indexes 40,41 in accordance with an ascending order of the data field values. For example, in the "title" index 40 of FIG. 9 a text data field that begins with the letter "a" is rearrange to precede a text data field that begins with the letter "b", and in the "actual" index 41 of FIG. 9 a numeric data field having a value of "100" is rearranged to precede a numeric data field whose value is "200".

In the event of a "tie", for example, two "title" data fields of the report whose text content both begin with the letter "e", or two "actual" data fields of the report whose numeric values are both "123", then such a tie among two or more data fields is resolved by listing the data fields in the order of ascending field offset values; i.e., the tieing data field having the lowest field offset value is listed first in ordered index file 47.

Using the above-described sort technique in accordance with the present invention, and first considering the example text "title" index 40 of FIG. 9, an examination of the text titles of report pages 1 and 2 shown in FIGS. 6 and 7, using their corresponding page offsets and field offsets, reveals that sort function 46 of FIG. 10 discovers the following sequence of text data fields arranged by ascending order (wherein ascending order is defined as a-before-b, b-before c, etc); (1) "overtime", (2) "part time", (3) two occurrences of "regular" (i.e., a tie relative to the occurrence of a sort on the text "regular"), and (4) "trefoil".

Considering the example numeric "actual" index 41 of FIG. 9, an examination of the numeric values of report pages 1 and 2 shown in FIGS. 6 and 7, using their corresponding page offsets and field offsets, reveals that sort function 46 of FIG. 10 discovers the following sequence of numeric data fields arranged by ascending order (wherein ascending order is defined as 1-before-2, 2-before 3, etc.); (1) "0", (2) "303", (3) "1053898", (4) "29906680, and (5) "35000000". Note that no tie exists relative to a sort of these five numeric values.

Figure 11:
FIG. 11 shows an ordered "title" index file and an ordered "actual" index that is produced by operation of the sort function of FIG. 10.
Figure 11:

FIG. 11 shows an ordered "title" index file 140 and an ordered "actual" index file 141 (i.e., ordered index files 47 of FIG. 10) that is produced by operation of function 46 of FIG. 10 in accordance with the invention, and in accordance with the above described operation of FIG. 10's sort function 46.

In this relatively simple example, the content of FIG. 11 comprises the output of FIG. 10's function 47. Server 27 now operates to archive store "REPORT 540" shown in FIGS. 4 and 5, as well as the two ordered index files shown in FIG. 11.

FIG. 11 shows that ordered index files 140,141 for the search items "title" and "actual" within "RECORD 540" is stored at index addresses "0" through "32", each address containing the 8-bytes that comprise the field offset and the page offset of a searchable data item. For example, address "24" of "actual" index 141 contains the 8-byte data content "0200 0000" (decimal) which refers to the value "29406680", as depicted in FIG. 6.

In summary, operation of the invention has utilized ACIF index output 16 of a well-known FIG. 1 data archival system to produce and archive store a unique ordered index of each searchable item that is contained in a data record such as MODCA report 14 of FIG. 1. More specifically, each unique class of searchable items (for example, a text class and a numeric class) that is contained in ACIF index 16 is ordered in a serial sequence (in this example in an ascending order) in accordance with the actual data content of the report's searchable data fields. In accordance with the invention this ordered serial sequence can be in descending or ascending order, the only qualification being that the index and search facilities must know and operate upon the same sequence.

Users, such as clients 26 of FIG. 1A, may now search archival storage 28 using user-specified search keys, for example by specifying a "title" data field, and/or by specifying the numeric value of an "actual" data field, in the example "REPORT 540" of FIGS. 4 and 5. FIG. 12 shows an example display screen 49 that is presented to a user to allow the user to specify one or both of a "title" search term and/or an "actual" search term, or an "actual" search term range, that is to be used as a search key(s) for FIG. 1A's archive storage 28. In this example, the user has specified the "title" search key "regular" in screen field 50, and has specified the "actual" search range "1000000-to-40000000" in screen fields 51 and 52, respectively. The user may now begin the search (consisting of (1) binary searches to identify the range, (2) optimizing the order in which to do filtering, and (3) filtering), by using a mouse, or the like, to select screen field 53.

In the following description, and as a nonlimiting feature of the invention, a search-order parameter is defined in report definitions 29 shown in FIG. 8, this search order being the order "title" and then "actual" in which the records are contained in report definitions 29. The order of report definitions 29 defines the order in which the two ordered index files 140,141 of FIG. 11 will be searched, and requires that when both indexes 140,141 are to be searched in order to satisfy a search request, such as is exemplified by FIG. 12, "title" index file 140 will be the first index to be subject to a binary search.

If desired, another file (not shown) can be provided to define the order in which to search groups of data files. As is well known, application 10 and ACIF 12 of FIG. 1 run an a regular basis. Such an additional file tells the search engine the order of the index files that are generated by instances of operation of devices 10,12.

As stated previously, as a feature of the invention indexes 140,141 are first searched to determine if the two search terms, (1) "regular" and (2) "1000000-to-40000000" are contained in the respective indexes 140 and 141. A review of FIG. 11 shows that both search terms are indeed contained therein, and thus binary searches will be made of these two indexes. Had this preliminary search reveled that one or both of the two search terms was not contained in the corresponding index 140,141, then a search-not-possible message would have been returned to the user by way of screen 49; for example, the screen message "No items matched the search criteria".

Because a search key need not match exactly, a single search key can result in a range of matches. For example the text search key SMITH* matches the range SMITHERS— SMITHSON.

For each of the search keys 50 or 51,52 two binary searches are performed. The first binary search identifies the lowest match in the range, and is "one more than the last one that did not match" (low_offset in the following C language code list). For example, for the data field order SMITERS preceded by SIMPSON, the term SMITHERS is "one more than the last one that did not match".

The second binary search identifies the highest match in the range, and is "one less than the first one that did not match" (high_offset in the following C language code list). For the above example, of the search key SMITH* wherein SMITHSON is followed by SMORE, the match SMITHSON is "one less than the first one that did not match" the search key.

The term "range" is the set of records between the first match and the last match; for example, the set of records between SMITHERS and SMITHSON. The range is empty, and a search will not be made, if low_offset equals high_ offset.

Considering the search keys defined at 50 and at 51,52 in FIG. 12, for 50 the search key "regular" is used for both binary searches of "title", for 51,52 the search key "1000000" is used for the low-match binary search of "actual", and the search key "40000000" is used for the high-match binary search of "actual".

With reference to FIGS. 6 and 7, this binary search of the data within "REPORT 540", using the field offsets and page offsets of FIG. 11's "actual" ordered index 141, identifies (1) index entry "0280 0000" at "actual" ordered index file offset "16" (corresponding to the report's page 1 data field "1053898"), and (2) index entry "1200 1000" at "actual" ordered index file offset "32" (corresponding to the report's page 2 data field "35000000").

This binary search retrieval method uses memory mapped files to access ordered index files 140,141 as an array in memory, and a memory mapped file to access the report file as a buffer.

Binary searches are also made of "REPORT 540" using the 4-byte field offsets and the 4-byte page offsets of FIG. 11's "title" index 140. These binary searches identify (1) ordered "title" index entry "0170 0000" at index field "16" (corresponding to the report's page 1 data field "regular"), and (2) ordered "title" index entry "1170 1000" at index file offset "24" (corresponding to the report's page 2 data field "regular").

More generally speaking, the number of search key matches are saved, as well the FIG. 11 index file offsets of the first and last match which are used to filter overlapped key matches.

After the above-described binary search process, the search results are optimized by determining which search key matched the fewest number of data items in "REPORT 450". This is done by (1) subtracting the index file offset value of the first and last match in ordered index 140, and (2) by subtracting the index file offset value of the first and last match in ordered index 141. Thus, for "title" index 140 the index file offset value "16" is subtracted from the index file offset value "24", to yield "8". Also, for "actual" index 141 the index file offset value "16" is subtracted from the index file offset value "32", to yield "16". Note when the above process results in a subtraction "tie", the following filter order will be the same as the search order that is defined by report definitions 29 of FIG. 8. By this process it is found that the fewest number of matches occurred for "title" index file 140; i.e., a subtraction result of "8".

The process of the invention now operates such that for each match in "TITLE", the record number is found wherein the match occurred, and for each match in "ACTUAL", the record number is found wherein the match occurred.

For example, for a "regular" search key match comprising field offset "0170" and a page offset "0000", the field offset is divided by the report's record length; i.e., 170/80=2, with a remainder of 10. Thus the first "regular" search match is on page 1, record 2, within the archival storage of "REPORT 540". In a like manner, for the "regular" search key match comprising field offset "0170" and page offset "1000", the above division result indicates that the second "regular" search match is on page 2, record 2, within the archival storage of "REPORT 540".

When this procedure is repeated for the three "actual" numeric range matches, the results indicate that the first match of "1053898" (250/80=3, remainder 40) is on page 1, record 3, and the second match of "29906680" (200/80=2, remainder 40) is on page 2, record 2, and the third match of "35000000" (200/80=2, remainder 40) is on page 2, record 2.

As a result of the overlap of matches at page 1 record 2, and page 2 record 2, these two search result items are presented to the requesting user.

More generally, the retrieval process of the present invention operates to filter the binary search result matches into overlapping key ranges to determine the set of report rows in REPORT 540 that match all of the specified search keys. By this filtering process, the multiple search keys are resolved to data records in REPORT 540 that satisfy all of the search keys. The same technique can be applied to identify records that are on the same report page.

As a first step of this portion of the process, the retrieval method optimizes the selection of overlapping keys by ordering the filtering process from the smallest number of search key matches to the largest number of search key matches.

The following is a sample structure of report data that will be used to explain this process, wherein the first column entitled "row" specifies the report row on which the three entries data, name and account are contained.

| row | date | name | account |
|---|---|---|---|
| 000 | 1/5 | SIMPSON | 123-100 |
| 100 | 1/5 | SMITHERS | 123-001 |
| 200 | 1/5 | SMITHING | 123-456 |
| 300 | 1/5 | SMORE | 123-002 |
| 400 | 2/5 | SIMPSON | 123-000 |

For this report data, an example binary search will be based upon a multiple search key query specifying the three following search keys (1) date=1/15, (2) name=SMITH*, and (3) account=123-456. For this example, one binary search match is obtained in report row 200 for the account search term "123-456", two binary search matches are obtained in report rows 100 and 200 for the name search term "SMITH*", and four binary search matches are obtained in report rows 000, 100, 200 and 300 for the data search term "1/5". Thus, the filtering process of the invention will operate in the order (1) account, (2) name, (3) date for this example.

Generically, the filtering process of the invention now starts with the search key that matched the smallest number of report rows in the binary search process, i.e. search key "123-456" that matched only one report row. For each row that this search key matches (in this case only row 200), the filtering process checks to see what other of the matched specified search keys occurs on the same report rows, again checking in the order of the smallest number of matches; i.e., the search key SMITH*.

More specifically, it is found that for the name search term SMITH*, only the term SMITHING occurs on the account row match of row 200. Thus the name match at row 200 is discarded.

The filtering process now finds that for the four date search term matches of "1/5", only one of them occurs on row 200. Thus, the filtering process has operated to locate one data record as a result of this filtering process, namely the record "1/5, SMITHING, 123-456" at row 100 of the report.

Note that this filtering process does not perform any kind of search key comparison to data within the report. Rather, the filtering process compares the offset of each report record in the range that the key comparison matched to determine set inclusion. This 4-byte integer comparison is much more efficient than a multi-byte search key comparison.

FIG. 13 shows the results of the binary search as they are presented to the user as a result of the search request shown in FIG. 12. Display screen field 55 presents the data content of "RECORD 540" at page 1 record 2, and page 2 record 2 for viewing by the requesting user. If desired, the user may select to view "RECORD 540" by selection of screen field 56.

From the above description it can be seen that for retrieval of archival data in accordance with the invention a binary search is conducted for each search key in the search query, using memory mapped files to access the index file as an array in memory and using the report file as a buffer. Using the index offsets into the report file buffer, the query key(s) is compared against the index key for the first and last entries in the index to make sure that the query key is within the range of keys for the index. A binary search is then performed using the query keys and the index offsets into the report file. The number of matches is saved, as well as the offset of the first and last matches. The retrieval method of the invention filters the matches so as to resolve multiple keys to records that satisfy all of the search keys, thereby determining the set of report rows that match all of the specified keys.

The following code segment is an example of the use of the well known C language to optimize, filter and sort as above described.

```
/* Sort the Query Descriptor elements from smallest number
*/
/* of matches to largest. Include in the sort order only
those */
/* query fields that have indexes associated with them. */
index_count = optimized_search_order (qd, qd_max, s);
/* Optimize the search order by starting with the field */
/* that matched the fewest keys. */
for (i = qd[s[0]].low_off; i <= qd[s[0]].high_off; i++)
{
  match = TRUE;
  primary_val = get_index_val (&qd[s[0]], i);
  for (j = 1; j < index_count && match; j++)
  {
    match = FALSE;
    for (k = qd[s[j]].low_off; k <= qd[s[j]].high_off &&
    !match;
    k ++;
    {
      test_val = get_index_val (&qd[s[j]], k);
      if (test_val == primary_val)
        match = TRUE;
    }
  }
  if (match && apply_filters (qd, qd_max, sd))
    add_to_hitlist (key_ptr, primary_val, sd, qd, qd_max,
  hd);
}
``` wherein the code line reading "index_count = optimize_search_order (qd, qd_max, s);" comprises the optimization step, wherein the term "get_index_val" is a function that converts index offset to a line data page or row number, and wherein the term "(test_val == primary_val" operates to compare record row numbers.

The invention has been described in detail while making reference to preferred embodiments thereof. Since it is recognized that those skilled in the art will readily visualize yet other embodiments that are within the spirit and scope of this invention it is not intended that this detailed description be taken as a limitation on the spirit and scope of the invention.

What is claimed is:

1. A report archive, distribution and retrieval apparatus, comprising:

archival digital storage means containing at least one report file that contains a plurality of individual pages;

each individual one of said pages being identified by a page-offset;

each individual one of said pages containing a plurality of individual rows of data wherein each of said rows of data may contain both text data fields and numeric data fields;

the physical location within a page of each individually text-data fields and each individual numeric-data fields being identified by an associated field-offset;

index storage means containing an alphabetic-ordered text-index for said text-data fields and a number-ordered numeric-index for said numeric-data fields;

each of said two ordered indexes containing a plurality of index-addresses;

each individual index-address pointing to an ordered index entry that comprises a page-offset and a corresponding field-offset that respectively point to a page and to a row within said page whereat a corresponding text-data field or a corresponding numeric-data field may be found within said report file;

distributed computing means enabling users to specify an alphabetic search key and a number search key; and a search engine responsive to said alphabetic search key and to said number search key and operable to perform binary searches of said report file in accordance with said order of said two ordered indexes;

said search engine operating to determine a first data field range comprising page-offsets and field-offsets of text-data within said report file wherein all of the associated alphabetic text satisfies said alphabetic search key;

said search engine operating to determine a second data field range comprising page-offsets and field-offsets within said data record wherein all of the associated number data satisfies said number search key;

computing means operable to interrogate said first and second data field ranges to determine portions of said report file that are common to said first data field range and to said second data field range; and display means for visually displaying said common portions of said report file in accordance with said determination by said computing means.

2. The apparatus of claim 1 wherein memory mapped files are used to access said alphabetic-ordered text-index and number-ordered numeric-index and to access said report file as a buffer.

3. The apparatus of claim 1 wherein said each of said report file rows is of a common and fixed byte-length, wherein said field-offsets express a byte-length-position of alphabetic data or number data within a row, and wherein said first and second data field ranges are determine by dividing page-offsets of data fields that match said search keys by said fixed byte-length of said rows.

* * * * *